United States Patent [19]

Hammond et al.

[11] Patent Number: 4,860,594
[45] Date of Patent: Aug. 29, 1989

[54] APPARATUS AND METHOD FOR MEASURING MASS FLOW AND DENSITY

[75] Inventors: Gary C. Hammond, Bancroft; George A. Corser; Dale P. Eddy, both of Flint, all of Mich.

[73] Assignee: GMI Engineering & Management Institute, Flint, Mich.

[21] Appl. No.: 162,650

[22] Filed: Mar. 1, 1988

[51] Int. Cl.$^4$ ................................................. G01F 1/42
[52] U.S. Cl. ........................... 73/861.42; 73/861.61; 73/861.72; 73/861.03
[58] Field of Search ........... 73/861.42, 861.47, 861.52, 73/861.53, 861.61, 861.71, 861.72, 861.02, 861.03

[56] References Cited

U.S. PATENT DOCUMENTS

| | | |
|---|---|---|
| Re. 31,450 | 11/1983 | Smith . |
| 2,811,855 | 11/1957 | Kotas ................................. 73/861.72 |
| 3,049,919 | 8/1962 | Roth . |
| 3,167,691 | 1/1965 | Halista ............................... 73/861.72 |
| 3,584,508 | 6/1971 | Shiba . |
| 4,422,338 | 12/1983 | Smith . |
| 4,599,906 | 7/1986 | Freud ................................ 73/861.47 |
| 4,660,421 | 4/1987 | Dahlin ............................... 73/861.38 |

Primary Examiner—Herbert Goldstein
Attorney, Agent, or Firm—Brooks & Kushman

[57] ABSTRACT

The invention utilizes a segment of thin wall tubing which has an inlet, an outlet and a central region therebetween to measure flow. The central region is provided with two zones of different area. The meter is provided with a means to measure the elastic deformation of the tube in the two zones which results from the varying fluid flow and pressure. An output means is provided which evaluates the first and second zone deformation signals to generate a fluid mass flow output. Alternative embodiments include means to measure the elastic deformation of the tube to determine fluid density so that fluid mass flow may be determined when pressure and density are unknown.

33 Claims, 4 Drawing Sheets

APPARATUS AND METHOD FOR MEASURING MASS FLOW AND DENSITY

FIELD OF INVENTION

This invention relates to methods of measuring flow and apparatuses therebefore, and more particularly to flow meters designed to measure mass flow and density of a fluid.

BACKGROUND OF INVENTION

Measuring mass flow of a fluid, particularly fluids of unknown or varying density, is a difficult task. The difficulty can be compounded greatly when the fluid is a liquid with entrained gas bubbles. When using constant displacement flow meters it is necessary to know or constantly monitor fluid density, and liquid gaseous mixtures are essentially incapable of being accurately measured. In order to solve some of the varying density problems associated with volume measuring devices, coriolis effect meters gained popularity in the early 1980's. While coriolis meters enabled mass flow of fluid in a conduit to be measured directly, coriolis meters have a number of problems, not the least of which are cost, accuracy in the low flow range, and pressure loss in the high flow range. Typical coriolis effect flow meters are illustrated in U.S. Pat. No. 4,422,338 and RE 31,450 of James Smith.

There have also been several attempts to measure mass flow in a closed conduit utilizing momentum techniques. U.S. Pat. No. 3,049,919—Roth and U.S. Pat. No. 3,584,508—Shiba disclose flow meters utilizing a movable U-tube which is provided with a pair of bellows joints to enable the U-tube to deflect, or to alternatively exert a load on the transducer proportional to the momentum of the fluid within the conduit. By knowing or calculating density, mass flow may be determined. Roth utilizes a transducer to weigh the cantileveredly supported U-shaped tube and a liquid contained therein to automatically determine density.

One of the major problems associated with U-tube momentum flow meters utilizing bellows or other expandable joints is inaccuracy resulting from pressure variations of the fluid being measured. Pressure variations cause the bellows to expand or contract. In addition, the shape of a bellows inherently causes problems since solid debris suspended in a fluid may accumulate in the bellows. Problems associated with bellows are serious and greatly reduce the number of applications for flow meters in which bellows are required.

OBJECTS, FEATURES AND ADVANTAGES OF INVENTION

An objective of the present invention to develop a mass flow meter capable of determining mass flow rate of a fluid of unknown density.

Yet another objective of the invention to provide an apparatus and a method for measuring mass flow of a fluid whose pressure and temperature vary.

A feature of the present invention is the capability of the apparatus to measure mass flow without moving parts or pressure sensitive joints.

A further feature of the present invention is that the design is less likely to accumulate debris than bellows joints.

An advantage of the present invention is the capability to measure flow accurately over a large operating range with relatively small pressure losses.

These and other objects, features and advantages of the present invention are apparent from the review of the accompanying description of the preferred embodiment.

SUMMARY OF INVENTION

The apparatus and method for measuring flow of the present invention utilizes a segment of thin wall tubing which has an inlet, an outlet and a central region therebetween. The central region is provided with two zones: A first zone of diameter $D_1$ and a first wall thickness $T_1$; and a second zone of diameter $D_2$ and a second wall thickness $T_2$. The diameters and wall thicknesses are selected so that $D_1/T_1$ is substantially equal to $D_2/T_2$. The meter is provided with a means to measure the elastic deformation of the tube in the first zone which results from the varying fluid flow and pressure. The meter is further provided with a means to measure the elastic deformation in a second zone of the tube which similarly results from varying fluid flow and pressure. An output means is provided which evaluates the first and second zone deformation signals to generate a fluid flow output. Alternative embodiments of the invention include means to measure the elastic deformation of the tube to determine fluid density so that fluid mass flow may be determined when density is unknown.

BRIEF DESCRIPTION OF THE PREFERRED EMBODIMENT

Figure 1:
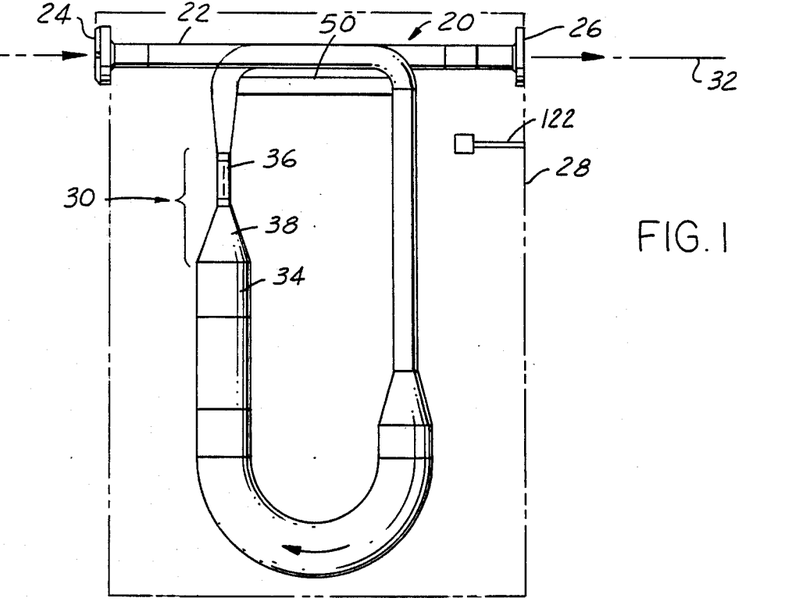
FIG. 1 is a front view of a preferred flow meter embodiment.

A first preferred embodiment of the invention is illustrated by way of example in FIGS. 1-10 and 12-14. FIG. 1 shows a flow meter 20 formed of a generally looped shaped tube 22 having a fluid inlet 24 and a fluid outlet 26. Preferably, tube 22 is contained within a housing 28 which is shown in phantom outline for illustration purposes. The inlet and outlet ends of tube 22 are attached to housing 28 and the central region of tube 22 is freely suspended therebetween. The central region of the tube 30 has a varying diameter. As fluid flows through the flow meter, certain loads are exerted on the walls of the tube which are a result of the pressure of fluid, changes in momentum of the fluid caused by bends and diameter changes, and the weight of the fluid. Additionally, the loads exerted on the tube wall will vary with temperature, gravitational constant, and atmospheric pressure. Flow meter 20 is used to determine the volumetric and mass flow rate of a fluid having an unknown temperature and density. The flow rate is determined by monitoring the deformation of the tube walls using a number of deformation sensors such as strain gages or the like. The apparent strain which is measured on any portion of the tube wall will invariably be a result of a multiple of effects, i.e., pressure, momentum, temperature, etc. In order to deetermine flow rate, it is necessary to take a number of deformation measurements at carefully selected positions on the tube so that one can simultaneously solve the strain equations to determine mass flow rate.

Flow meter 20 is designed to be mounted having inlet 24 and outlet 26 oriented parallel to a horizontal axis 32 when viewed in a side elevation. The looped central region 30 hangs below axis 32. Many alternative mounting arrangements and configurations are possible, provided the mounting arrangement is known so that the gages and the stress equations can be appropriately selected. In the embodiment of the invention shown in FIG. 1 the central region of the tube 30 is provided with a large diameter section 34. The large diameter section achieves two purposes; it increases the volume of the tubes so that a sufficient quantity of fluid can be obtained for a weight signal without having a very long and bulky apparatus, and secondly it increases the cross-sectional area of the tube so that velocity and momentum are at a low level. The central region of the tube 30 is additionally provided with a small diameter section 36 where fluid velocity and momentum will increase substantially over that of the large diameter section 34 of the tube. Preferably, a tapered transition section 38 extends between large and small diameters sections 36 and 34 to minimize energy losses. The relative diameters of the large and small sections 34 and 36 have a very significant effect on the pressure distribution exerted on the tube wall. It is also important to note that the thickness of the tube wall will likewise significantly effect the stress and the deformation of the tube wall resulting from the flow of fluid.

Figure 5:
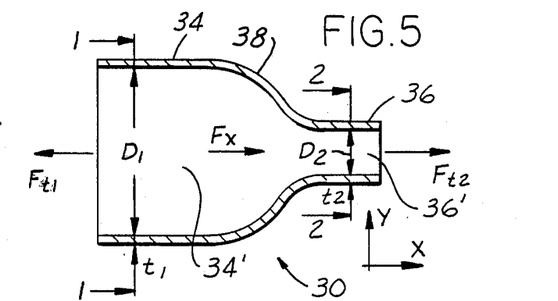
FIG. 5 is a free body diagram of the tapered tube.

In FIG. 5 an enlarged cross-section of the tube is illustrated showing large and small diameter sections 34 and 36 and the tapered section therebetween. The diameter and thickness of the tube in the large first diameter section of the tube is designated $D_1$ and $T_1$ respectively. The diameter thickness of the tube in the small, or second diameter section is referred to as $D_2$ and $T_2$ respectively. These diameters are critical in the region in which the deformation of the tube is to be monitored. In the large diameter U-shaped portion of the tube, for example, where there are no strain gages, tube wall thickness is not critical provided that the tube wall is thick enough to have the necessary structural characteristics.

NOZZLE CONFIGURATION

Figure 3:
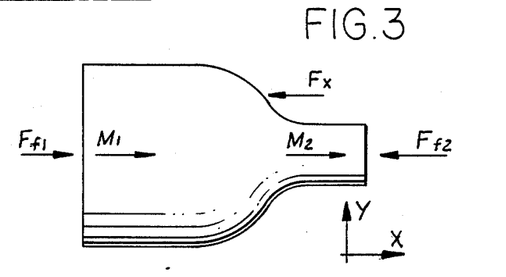
FIG. 3 is a control volume of fluid contained in the tapered tube.
Figure 6A:
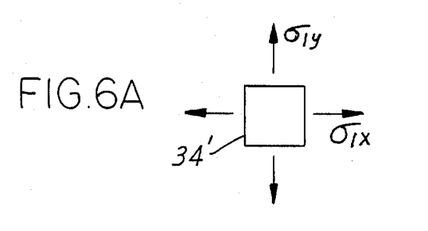
FIG. 6A is a stressed element from section 1 of FIG. 5.
Figure 6B:
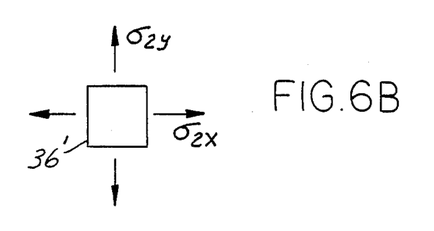
FIG. 6B is a stressed element from section 2 of FIG. 5.

A nozzle configuration shown in FIGS. 3 and 5 is analyzed for the relationship between flow variables and deformations in the tubing material. Stresses in the tube wall in section 1, a point 34' and section 2, a point 36' as shown in FIGS. 5, 6A and 6B can be analyzed using the principles of statics for a biaxial stress condition with zero shear. Flow through the tapered tube can be analyzed as a classic nozzle using the fundamental laws of flow for a classical fluid taking into consideration momentum flux, energy flux, mass flux and system pressure variations.

Figure 4:
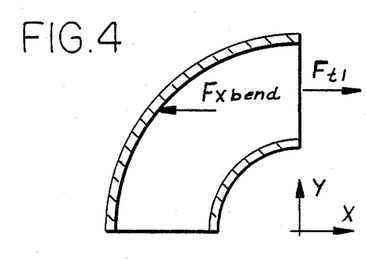
FIG. 4 is a free body diagram of the bend just upstream of the tapered tube.

A free body diagram of the tapered tube is shown in FIG. 5. A control volume of the fluid in the tapered tube is shown in FIG. 3. A free body diagram of the bend just upstream and adjacent to the tapered tube is shown in FIG. 4. A control volume of the fluid contained in the bend is shown in FIG. 2.

It is important to note in FIGS. 3 and 5 that the vector $F_x$ represents the interacting force between the fluid and the tube. This interacting force $F_x$ is the sum of the x components of the pressure forces acting at the tapering section 38. Vector $F_{xbend}$ represents the x directed component of the interacting force between the fluid and the bend, as shown in FIGS. 2 and 4. It is the sum of the x components of the pressure forces acting at the bend.

Flow Theory

Figure 2:
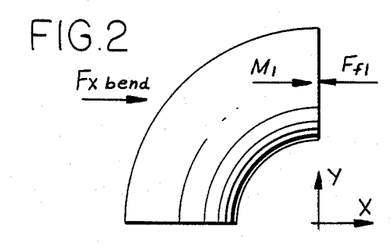
FIG. 2 is a control volume of fluid contained in the bend just upstream of the tapered tube.

Referring to FIGS. 2-3, the force and momentum equations for the fluid can be written as follows; where subscript f refers to the fluid:

$F_{f1} = P_1 A_{f1}$
$F_{f2} = P_2 A_{f2}$
$F_x = \int (PdA)_x$
$F_{xbend} = \int (PdA)_{xbend}$
$M_1 = \rho Q V_1$
$M_2 = \rho Q V_2$ Where:
$F_{f1}$ = Fluid pressure force at section 1
$F_{f2}$ = Fluid pressure force at section 2
$P_1$ = Average pressure at section 1
$P_2$ = Average pressure at section 2
$A_{f1}$ = Fluid flow area at section 1
$A_{f2}$ = Fluid flow area at section 2
$M_1$ = Momentum flux at section 1
$M_2$ = momentum flux at section 2
$\rho$ = Fluid density (assumed constant)
$Q$ = Volumetric flow rate
$V_1$ = Average velocity at section 1
$V_2$ = Average velocity at section 2

Application of the momentum principle for FIG. 2 gives:

$\Sigma F = \Sigma M$
$F_{xbend} - P_1 A_{f1} = M_1$
$F_{xbend} = P_1 A_{f1} + \rho Q V_1$ Application of the momentum principle for FIG. 3 gives:

$$\Sigma F = \Sigma M \qquad \text{Eq. 2}$$

$$F_{f1} - F_x - F_{f2} = -\rho Q V_1 + \rho Q V_2$$

$$F_x = F_{f1} - F_{f2} + \rho Q V_1 - \rho Q V_2$$

or $$F_x = P_1 A_{f1} - P_2 A_{f2} + \rho Q V_1 - \rho Q V_2$$

Application of the energy principle for FIG. 3, neglecting losses, gives:

$$P_1 + \rho(v_1^2/2) = P_2 + \rho(v_2^2/2) \qquad \text{Eq. 3}$$

or $$P_2 = P_1 + \rho/2(V_1^2 - V_2^2) \qquad \text{Eq. 4}$$

Application of the continuity principle for FIG. 3 gives:

$$Q = V_1 A_{f1} = V_2 A_{f2} \qquad \text{Eq. 5}$$

or $$V_1 = Q/A_{f1} \text{ and } V_2 = Q/A_{f2} \qquad \text{Eq. 6}$$

An expression for $F_x$ as a function of flow variables is obtained by substituting equations 4 and 6 into Equation 2.

$$F_x = P_1(A_{f1} - A_{f2}) - A_{f2}(\rho Q^2/2)(1/A_{f1}^2 - 1/A_{f2}^2) + \rho Q^2(1/A_{f1} - 1/A_{f2}) \qquad \text{Eq. 7}$$

Equation 7 shows that $F_x$ is the combination of system pressure, $P_1(A_{f1} - A_{f2})$, change in kinetic energy, $A_{f2}(\rho(Q^2/2)(1/A_{f1}^2 - 1/A_{f2}^2)$ and x-directed change in momentum flux, $\rho Q^2(1/A_{f1} - 1/A_{f2})$. Thus, changes in system pressure, $P_1$, combined with changes in flow rate, Q, generate the total value of $F_x$ for a given tube geometry and fluid.

Forces and Stresses

Referring to FIGS. 4–5, the force equations for the tube section can be written as follows, where subscript t refers to the the tube:

$F_{s1} = \sigma_{1x} A_{t1}$
$F_{s2} = \sigma_{2x} A_{t2}$
$F_x = \int (PdA)_x$
$F_{xbend} = \int (PdA)_{xbend}$ Where:
$F_{t1}$ = The axial force in the tube wall at section 1
$F_{t2}$ = The axial force in the tube wall at section 2
$\sigma_{1x}$ = The axial stress in the tube wall at section 1
$\sigma_{2x}$ = The axial stress in the tube wall at section 2
$A_{t1}$ = The cross-sectional area of the tube at section 1
$A_{t2}$ = The cross-sectional area of the tube at section 2
$F_x$ = The sum of the x directed pressure forces between sections 1 and 2
$F_{xbend}$ = The sum of the x directed pressure forces at the bend Application of the equilibrium equation to the free body diagram of FIG. 4 gives:

$$\Sigma F_x = 0$$

-continued $$-F_{xbend} + F_{t1} = 0$$

Substituting Equation 1 into the above equation gives:

$$F_{t1} = P_1 A_{f1} + \rho Q V_1 \qquad \text{Eq. 8}$$

or $$\sigma_{1x} A_{t1} = P_1 A_{f1} + \rho Q V_1$$

Application of equilibrium equation to the free body diagram of FIG. 5 gives:

$$-F_{t1} + F_x + F_{t2} = 0 \qquad \text{Eq. 9}$$

$$F_x = F_{t1} - F_{t2}$$

or $$F_x = \sigma_{1x} A_{t1} - \sigma_{2x} A_{t2}$$

Substituting Equations 2 and 8 into Equation 9 gives:

$$\sigma_{2x} A_{t2} = P_2 A_{f2} \rho Q V_2 \qquad \text{Eq. 10}$$

Re-writing Equations 8 and 10 where $A_{f1}/A_{t1} = D_1/4T_1$ and $A_{f2}/A_{t2} = D_2/4T_2$ for a thin wall tube, gives:

$$\sigma_{1x} = P_1 D_1/4T_1 + \rho(Q^2/A_{t1} A_{f1}) \qquad \text{Eq. 11}$$

and $$\sigma_{2x} = P_2 D_2/4T_2 + \rho(Q^2/A_{t2} A_{f2}) \qquad \text{Eq. 12}$$

From thin walled pressure vessel theory, the transverse (hoop) stresses, $\sigma_{1y}$ and $\sigma_{2y}$, are:

$$\sigma_{1y} = P_1 D_1/2T_1 \qquad \text{Eq. 13}$$

and $$\sigma_{2y} = P_2 D_2/2T_2 \qquad \text{Eq. 14}$$

where terms are previously defined.

Stresses and Strains

The bi-axial relationships between stress and strain applied to stressed elements of FIGS. 6A and 6B are:

$$\epsilon_{1x} = 1/E(\sigma_{1x} - \mu \sigma_{1y}) \qquad \text{Eq. 15}$$

$$\epsilon_{1y} = 1/E(\sigma_{1y} - \mu \sigma_{1x}) \qquad \text{Eq. 16}$$

$$\epsilon_{2x} = 1/E(\sigma_{2x} - \mu \sigma_{2y}) \qquad \text{Eq. 17}$$

$$\epsilon_{2y} = 1/E(\sigma_{2y} - \mu \sigma_{2x}) \qquad \text{Eq. 18}$$

Where:
$\epsilon_x$ = Strain in the axial direction at the section
$\epsilon_y$ = Strain in the transverse direction at the section
E = Modulus of elasticity
$\mu$ = Poisson's ratio Element 34 of FIG. 6A is representative of outside surface elements of wall material any where along a circumference at section one, as shown in FIG. 5.

Element 36 of FIG. 6A is representative of outside surface elements of wall material at section two, as shown in FIG. 5.

Preferred Arrangement of Flow Bridges

Figures 12, 13, 14:
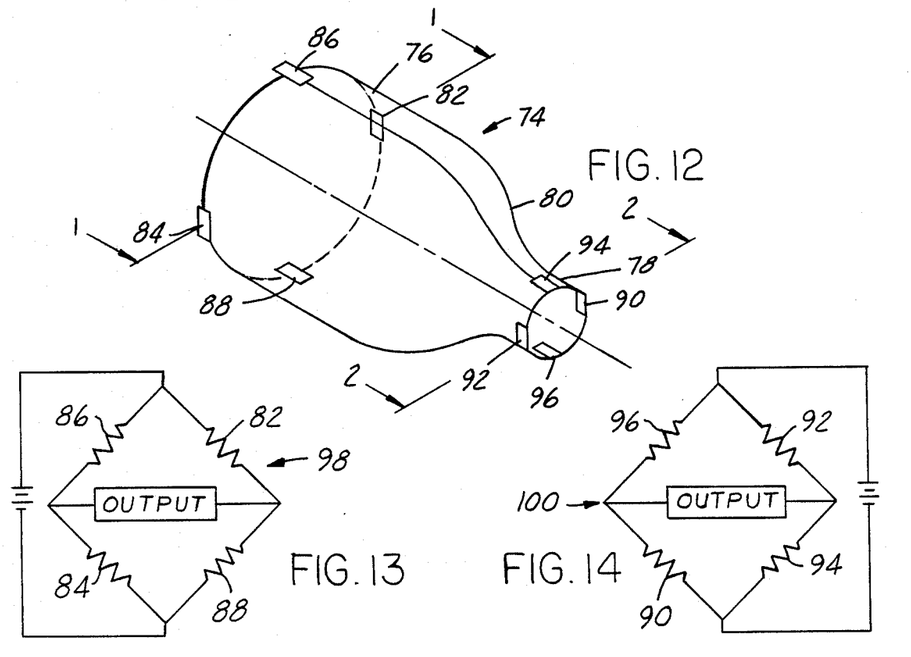
FIG. 12 is a diagram of a segment of tube showing the preferred orientation and location of strain gages.
FIGS. 13 and 14 are strain gage bridges formed of the gages mounted in accordance with the gage orientation shown in FIG. 12.

Flow bridge configurations are shown in FIGS. 12–14. A nozzle shaped segment of tubing 74 is shown in FIG. 12 in perspective outline. Gages 82, 84, 86 and 88, as shown in FIG. 13, complete a first bridge, 98, at the large diameter, first section 76. Gages 90, 92, 94 and 96, as shown in FIG. 14, complete a second bridge 100 at the small diameter second section 78.

The output of first bridge 98 at the large diameter first section 76 is given by:

$$B.O.1 = 2(\epsilon_{1x} - \epsilon_{1y}) \qquad \text{Eq. 19}$$

and the output of bridge 100 at the small diameter second section 78 is given by:

$$B.O.2 = 2(\epsilon_{2x} - \epsilon_{2y}) \qquad \text{Eq. 20}$$

Substituting Equations 11 and 13 into Equations 15 and 16 gives expressions for $\epsilon_{1x}$ and $\epsilon_{1y}$. Then substituting these expressions into Equation 19 gives:

$$B.O.1 = (2(1+\mu)/E)[-P_1 D_1/4T_1 + \rho Q^2/A_{t1} A_{f1}] \qquad \text{Eq. 21}$$

Substituting Equations 12 and 14 into Equations 17 and 18 gives expressions for $\epsilon_{2x}$ and $\epsilon_{2y}$. then substituting these expressions into Equation 20 gives:

$$B.O.2 = (2(1+\mu)/E)[-P_2 D_2/4T_2 + \rho Q^2/A_{t2} A_{f2}] \qquad \text{Eq. 22}$$

Using Equations 4 and 6, Equation 22 becomes:

$$B.O.2 = (2(1+\mu)/E)[\, -P_1 D_2/4T_2 + \qquad \text{Eq. 23}$$
$$\rho Q^2 \{(D_2/8T_2)(1/A_{f2}^2 - 1/A_{f1}^2) + 1/A_{t2} A_{f2}\}]$$

From Equations 21 and 23 it is evident that both B.O.1 and B.O.2 are functions of pressure at section one, $P_1$, and flow rate, Q, for a given density. From these measured bridge outputs, values of flow rate and pressure can be computed.

Density Measurement

Figure 7A:
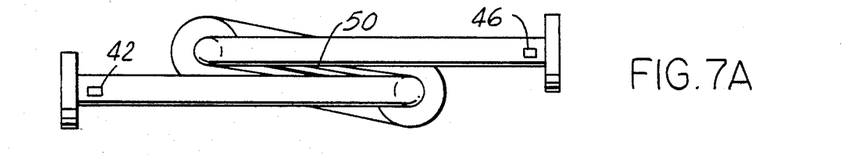
FIG. 7A is a top view of the flow meter of FIG. 1.
Figure 7B:
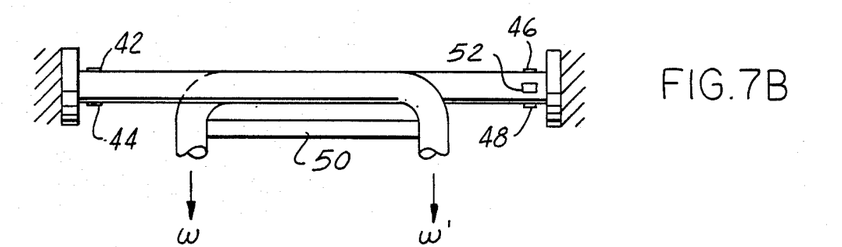
FIG. 7B is a partial front view of the flow meter of FIG. 7A showing the load exerted thereupon.
Figure 8:
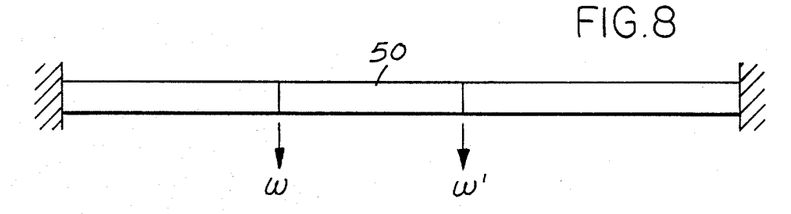
FIG. 8 is a schematic diagram of a beam supported at both ends which is analogous to the structure shown in FIG. 7B.
Figures 9, 10, 11A:
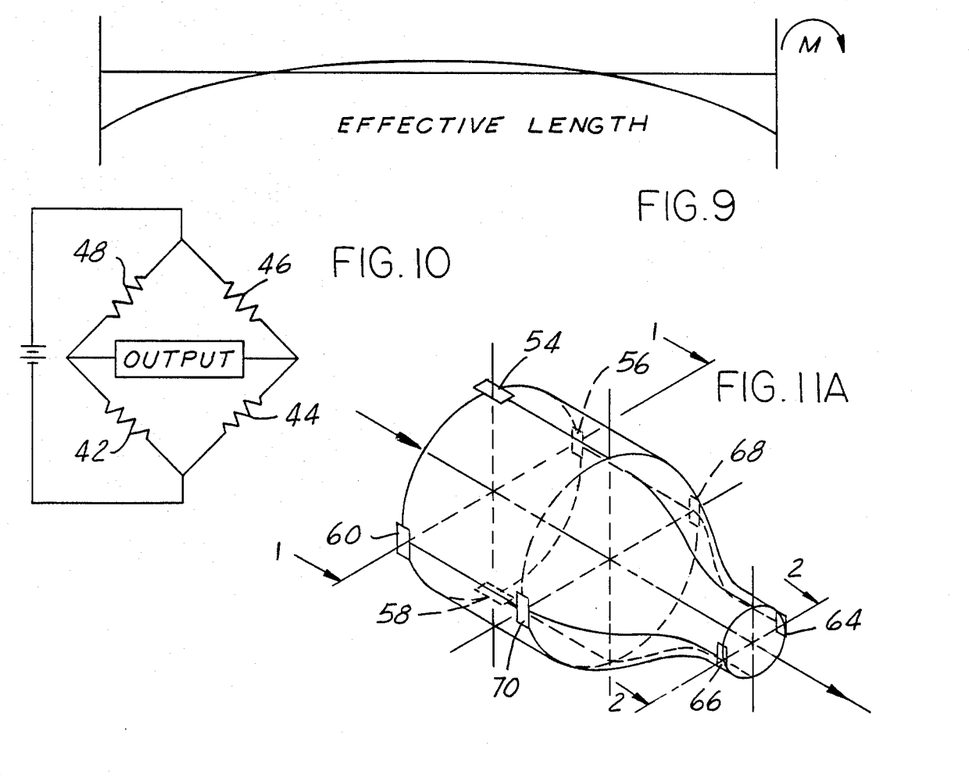
FIG. 9 is the moment diagram for the beam of FIG. 8.
FIG. 10 is a diagram of a strain gage bridge to measure density.
FIG. 11A is a diagram of a segment of tube showing an alternate strain gage orientation.

As previously described in FIG. 1, the flow meter tube 22 is suspended by its tube ends with the tube extending therebetween freely suspended. Strain gages are oriented on the tube wall adjacent inlet 24 and outlet 26 in a longitudinal manner on the top and bottom of the tube to most effectively measure bending moment. Preferably, four gages 42, 44, 46 and 48 are oriented as shown in FIG. 7B. Gages 44 and 48 will be loaded in compression, and gages 42 and 46 will be loaded in tension as a result of the bending moment exerted on the tube. To isolate the large and small diameter sections 34 and 36 of the tube from the bending load, brace 50 is affixed to the opposite legs of the U-shaped portion of the tube to carry the bending load. Brace 50 results in a structure which is mechanically equivalent to a beam supported at both ends and loaded at two points, as shown in FIG. 8. The two downwardly directed arrows W represent the load attributed to the weight of the tube and fluid therein. The moment diagram for the beam of FIG. 8 is shown schematically in FIG. 9. By placing the gages adjacent each end the largest moment induced strain may be measured. The moment and the resulting strain will vary directly as a function of fluid density. The outputs of the four gages 42–48 are combined in a Wheatstone bridge as shown in FIG. 10, and an output is processed using an amplifier to determine density. Preferably, a temperature sensor 52, shown in FIG. 7B, is placed on the tube so that any perceived strain resulting from temperature variation can be compensated.

Alternate Gage Arrangement

Figures 11B, 11C:
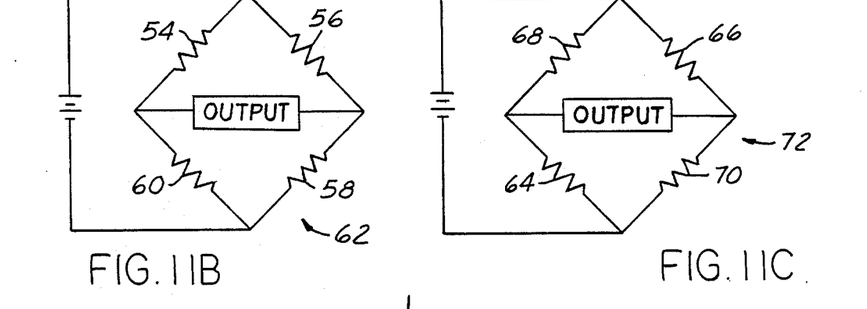
FIGS. 11B and 11C are alternative strain gage bridges used in conjunction with the FIG. 11 embodiment.

A perspective view of the nozzle of FIG. 5 is shown in FIG. 11A illustrating an alternate gage orientation in the first and second tube regions. Gages 54, 56, 58 and 60 are placed in the first segment of the tube. Gages 54 and 58 are oriented in the longitudinal direction, and gages 56 and 60 are oriented in the hoop direction. The gages are arranged in a Wheatstone Bridge shown in FIG. 11B with the hoop gages located at opposite arms of the bridge.

$$B.O.P. = 2(\epsilon_{1x} - \epsilon_{1y}) \qquad \text{Eq. 24}$$

The bridge of FIG. 11B may be referred to a a pressure bridge 62 because the pressure of the first section is the principle factor affecting bridge output (B.O.P.).

A second bridge, which is shown in FIG. 11C, is formed of gages 64, 66, 68 and 70. The four gages are oriented in a Wheatstone bridge arrangement 72. All four gages forming bridge 72 are oriented in the hoop direction. Gages 64 and 66 are oriented on the small diameter section of the tube 36 and gages 68 and 70 are located on the large diameter section of the tube 34. Bridge 72 is referred to as a flow bridge since flow is a more dominate factor affecting the bridge output. The output of flow bridge (B.O.F.) is expressed as follows:

$$B.O.F. = 2(\epsilon_{1y} - \epsilon_{2y}) \qquad \text{Eq. 25}$$

Alternate Bridge Arrangement

Substituting Equations 11 and 13 into Equations 15 and 16 yields a result which, when substituted into equation 24, simplifies to:

$$B.O.P = AP_1 + B\rho Q^2 \qquad \text{Eq. 26}$$
Where:

$$A = -[(1+\mu)(D_1)]/[(2E)(T_1)] \qquad \text{Eq. 27}$$

and $$B = 2(1+\mu)/[EA_{t1} A_{f1}] \qquad \text{Eq. 28}$$

Similarly, substituting Equations 11, 12, 13 and 14 into Equations 16 and 18 yields a result which, when substituted into equation 25, and rearranging terms, gives:

$$B.O.F = CP_1 + D\rho Q^2 \qquad \text{Eq. 29}$$
Where:

$$C = (2-\mu)/2E \, (D_1/T_1 - D_2/T_2) \qquad \text{Eq. 30}$$

and $$D = \tfrac{1}{4} E \{-(2-\mu)(D_2/T_2)(1/A_{f1}^2 - 1/A_{f2}^2) - \qquad \text{Eq. 31}$$
$$8\mu(1/A_{t1} A_{f1} - 1/A_{t2} A_{f2})\}$$

Alternate Flow Meter Designs

Figure 15:
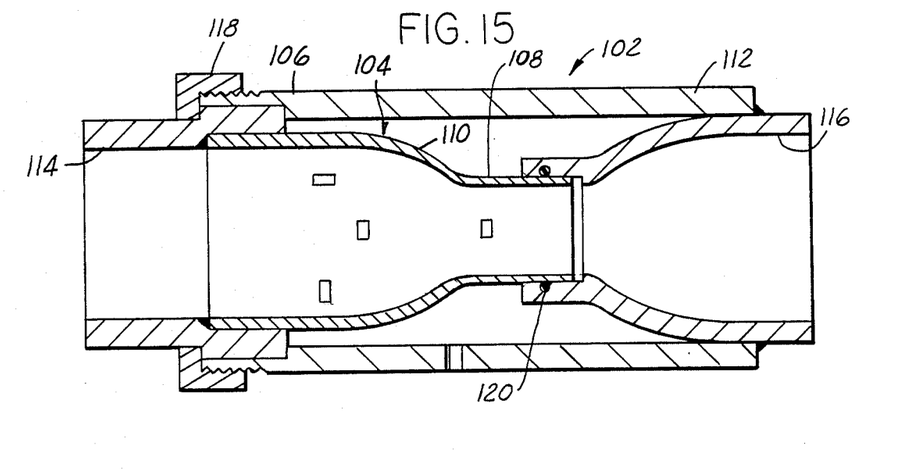
FIG. 15 is an alternative embodiment of the invention.

A flow meter of an alternate design 102 is shown in FIG. 15 of an in-line construction. Flow meter 102 is provided with a segment of thin wall tube 104 provided with a large diameter section 106, a small diameter section 108 and a tapered transition zone 110 therebetween. Tube 104 is generally supported by a housing 112. The tube 104 is rigidly affixed to inlet 114 and telescopically sealingly cooperating with outlet 116. The tube 104 and inlet 114 combination is held securely to housing 112 by nut 118. Tube 104 is freed to expand axially relative to outlet 116 due to the limited axial clearance. A liquid tight seal between the small diameter section 108 of the tube and the outlet 116 is achieved by O-ring 120. The gage configuration shown is similar to that of FIG. 11A previously described. Note, however, that the alternative gage arrangement shown in FIG. 12 could similarly be utilized in this embodiment. The primary difference between the flow meter 102 and flow meter 20 is that alternate design flow meter 102 is not designed incorporating a means to measure fluid density, therefore, it can only be used with fluids of known constant density. Note, however, a density sensing device can be incorporated in or located separate from the flow meter to provide a density input to the flow meter output circuit. The flow meter housing 112 is preferably formed so that the tube section 104 can be easily installed and removed. In the embodiment shwn in FIG. 15, the inlet portion of 114 is threadedly detachable from the body of housing 112 to allow the installation or removal of tube section 104. Note, the gages will be oriented on the external periphery of the tube section and the appropriate wiring will be needed to connect the gages to the output circuit which is not shown.

Flow Output Circuitry

Figure 16:
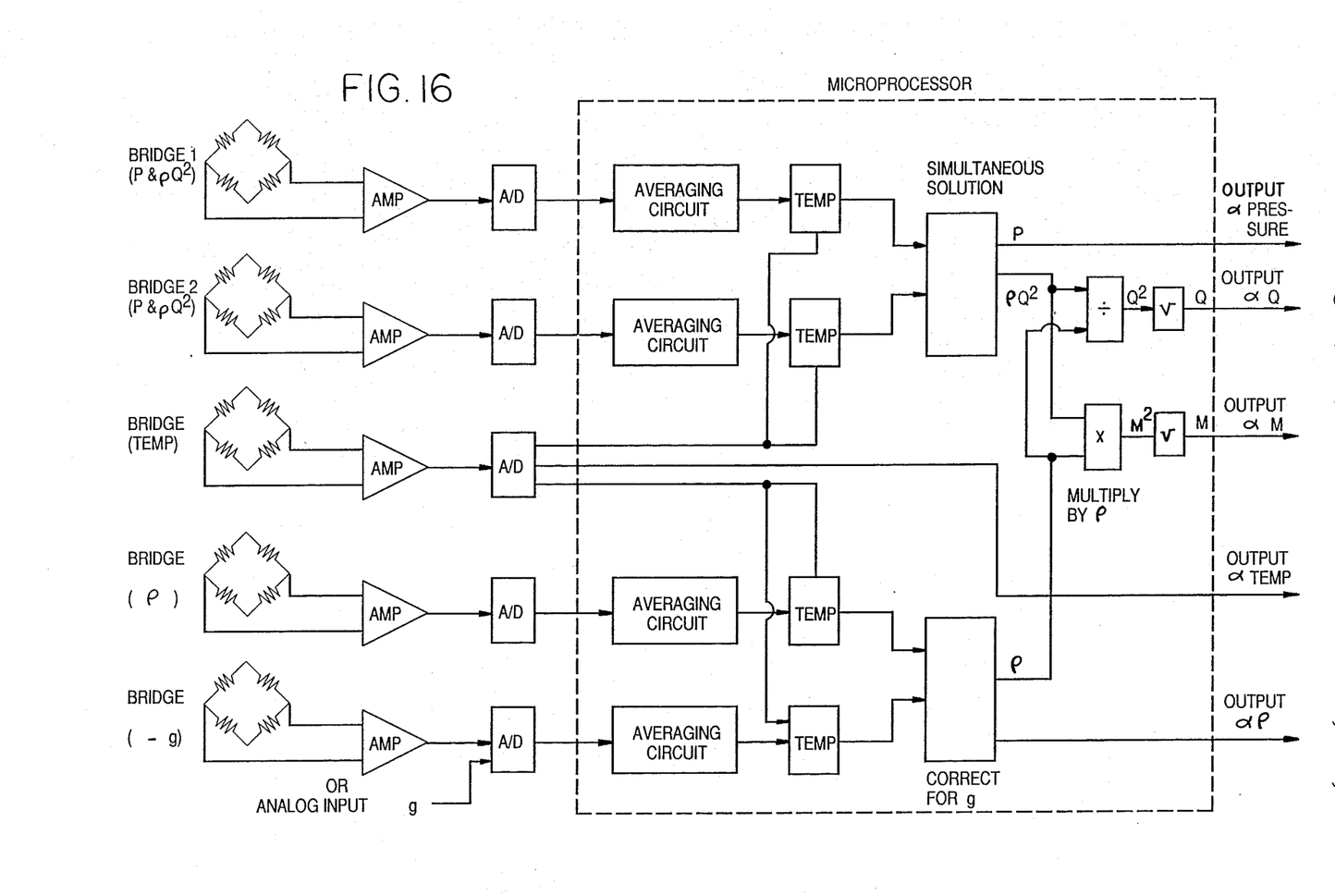
FIG. 16 is a block diagram showing a representative electrical circuit to output fluid mass flow, volumetric flow, pressure, temperature and density.

A schematic diagram of a output circuit is shown in FIG. 16. The output circuit is designed to be used with flow meter 20 having a gage orientation shown in FIGS. 12-14.

Each strain gage bridge circuit is activated with opposing power supplies such that the bridge output terminals will be at nearly ground potential at all times. This improves the common mode rejection ratio performance of the following amplifier. After bridge output signals are amplified to sufficient levels, the signals are converted by A/D (analog to digital) converters to corresponding digital signals. Using a microprocessor, all of the bridge signals except temperature are averaged to reduce the influence of noise on the signals. These averaged signals are then corrected for temperature affects such as strain gage output drift to remove any variations due to temperature.

The two corrected flow bridge outputs (bridge #1 and bridge #2) are then simultaneously solved to yield outputs equal to the system operating pressure, $P_1$, and the flow rate in terms of $\rho Q^2$ using the algorithm for bridge output previously described. By dividing this output by the density output $\rho$, a signal $Q^2$ is obtained from which volumetric flow $Q$ is determined. If the output $\rho Q^2$ is multiplied by the density output, $\rho$, a signal $m^2$ is obtained from which mass flow, m, is determined. The corrected density bridge output may be compensated for gravity. Gravity may be sensed using a gravity sensor such as gaged cantilever beam 122 in FIG. 1, or alternatively, a manual input may be provided to calibrate the meter for a particular location.

Method of Measuring Flow

Using a flow meter of the type previously described, a nozzle method of measuring flow can be carried out. The first step of the method is to direct fluid flow to be measured through a segment of thin wall tubing which has an inlet, an outlet and a central region therebetween. The central region of the tube is provided with a first zone diameter $D_1$ and a wall thickness $T_1$ and a second zone having a diameter $D_2$ and a wall thickness $T_2$, wherein $D_1/T_1$ is substantially equal to $D_2/T_2$. With flow through the tube established, the next steps are to measure the elastic deformation in the first and second zones to provide a first and second zone deformation signal. It is also necessary to provide a fluid density signal, and the final step involves the comparing of the first and second zone deformation signals and the density signal to calculate fluid mass flow. The method may also include as part of comparing the deformation signal step, the calculation of fluid pressure. The step of providing a fluid density signal may be the providing of a preset signal where fluid and density is assumed to be known and constant, or alternatively, the step may include measuring of the elastic deformation of the tube caused by the weight of the fluid therein to determine fluid density. The preferred method also includes the steps of measuring temperature of the tube and compensating the fluid flow output for temperature variation and the measuring of gravitational force to compensate the fluid mass flow output for variations in gravity.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

We claim:

1. A meter to measure flow, comprising:
   a thin wall tube having an inlet and an outlet and a central region therebetween which deforms circumaxially and longitudinally proportional to fluid flow, said tube central region provided with a first zone of diameter $D_1$, having a wall thickness of $T_1$, and a second zone of diameter, $D_2$, having a wall thickness of $T_2$, wherein $D_1$ and $D_2$ are substantially different; and
   sensor means to measure the distortion of the central region wall caused by the fluid flow to provide a deformation signal from which flow may be determined.

2. The invention of claim 1 wherein:
   $D_1/T_1$ is substantially equal to $D_2/T_2$; and
   said sensor means further comprises:
   first means to measure elastic deformation of the tube in the first zone which results from varying fluid flow and pressure, to provide a first zone deformation signal; second means to measure elastic deformation of the tube in the second zone which results from varying fluid flow and pressure, to provide a second zone deformation signal; and
   output means for processing the first and second deformation signals to provide a fluid flow output.

3. The invention of claim 2 further comprising means to support the inlet and outlet ends of the tube with the central region freely suspended therebetween.

4. The invention of claim 3 further comprising third means to measure the elastic deformation of the tube which results from the weight of the fluid in the central region, to provide a density signal.

5. The invention of claim 4 wherein the output means further processes the density signal to provide a fluid mass flow output.

6. The invention of claim 5 wherein the output means process the first and second zone deformation signals to enable fluid mass flow to be determined when fluid pressure is unknown and variable.

7. The invention of claim 6 wherein the first and second means to meaure elastic deformation further comprises a plurality of strain gages affixed to the tube wall.

8. The invention of claim 7 wherein said third means to measure elastic deformation further comprises at least one strain gage affixed to the tube wall.

9. The invention of claim 2 wherein the first and second means to measure elastic deformation further comprises a plurality of strain gages affixed to the tube wall.

10. The invention of claim 3 wherein said tube central region is further provided with a tapered transition zone extending between said first and second zones to enable to the fluid to flow therethrough with reduced energy loss.

11. The invention of claim 3 wherein said tube inlet and outlet ends are aligned along an axis, and said central region is bent in a loop extending outwardly from said axis.

12. The invention of claim 11 wherein the portion of the tube central region forming the loop which is farthest from the axis has a cross-sectional area greater than the tube inlet and outlet ends.

13. The invention of claim 5 further comprising means to measure temperature of the tube to provide a temperature signal, wherein said output means further compares the temperature signal to compensate for apparent strain due to temperature changes.

14. The invention of claim 5 further comprising gravity means to provide a gravitational force signal, wherein said output means further processes the gravity signal to correct the mass flow output for variations resulting in gravitational force.

15. The invention of claim 14 wherein said gravity means further comprises a gravitational force sensor.

16. The invention of claim 14 wherein said gravity means further comprises means to input a gravitational constant.

17. A meter to measure fluid flow, comprising:
a segment of thin wall tube having an inlet and an outlet end aligned along an axis and a central region therebetween of circular cross-sectiom formed in an elongated loop projecting away from and returning to the axis, said central region having a first zone of diameter $D_1$, having a wall thickness of $T_1$, and a second zone of diameter $D_2$, having a wall thickness of $T_2$;
means to support the inlet and outlet ends of the tube with the central region freely suspended therebetween;
first means to measure elastic deformation of the tube in the first zone which results friom varying fluid flow and pressure, to provide a first zone deformation signal;
second means to measure elastic deformation of the tube in the second zone which results from varying fluid flow and pressure, to provide a second zone deformation signal;
third means to measure the elastic deformation of the tube which results from the weight of the fluid in the central region, to provide a density signal; and
output means for evaluating the first and second zone deformation signal and the density signal to provide a fluid mass flow output.

18. The invention of claim 17 wherein said tube central region is further provided with a tapered transition zone extending between said first and second zones to enable the fluid to flow therethrough with minimal energy loss.

19. The invention of claim 18 wherein the output means further process the first and second zone deformation signals to enable fluid mass flow to be determined when fluid pressure is unknown and variable.

20. The invention of claim 19 further comprising means to measure temperature of the fluid to provide a fluid temperature signal, wherein said output means further compares the temperature signal to compensate for temperature changes.

21. The invention of claim 17 wherein the portion of the tube central region forming the loop which is farthest from the inlet and outlet ends has a cross-sectional area greater than the tube inlet and outlet ends.

22. The invention of claim 21 further comprising gravity means to provide a gravitational force signal, wherein said output means further compares the gravitational force signal to correct the mass flow output for variations resulting in gravitational force.

23. The invention of claim 22 wherein said gravity means further comprises a gravitational force sensor.

24. The invention of claim 22 wherein said gravity means further comprises means to input a gravitational constant.

25. A meter to measure the flow of fluid, comprising:
a segment of thin wall tube having an inlet and an outlet end and a central region therebetween, said central region having a first zone of diameter $D_1$, having a wall thickness of $T_1$, and a second zone of diameter $D_2$, having a wall thickness of $T_2$;
a support affixed to the inlet and outlet ends of the tube with the central region freely suspended therebetween;
a first sensor to measure elastic deformation of the tube in the first zone which results from varying fluid flow and pressure, to provide a first zone deformation signal;
a second sensor to measure elastic deformation of the tube in the second zone which results from varying fluid flow and pressure, to provide a second zone deformation signal;
a third sensor to measure the elastic deformation of the tube which results from the weight of the fluid in the central region, to provide a density signal; and
output means for evaluating the first and second zone deformation signals and the density signal to provide a fluid flow and a fluid pressure output.

26. The invention of claim 25 wherein said first, second and third means to measure elastic deformation further comprise a plurality of strain gages affixed to the tube wall surface.

27. The invention of claim 25 wherein said tube central region is further provided with a tapered transition zone extending between said first and second zones to enable the fluid to flow therethrough with minimal friction loss.

28. A method of measuring mass flow of a fluid in a tube or the like, comprising the following steps;
directing the flow of the fluid to be measured through a segment of thin wall tube having an inlet and outlet end in a central region therebetween of circular cross-section, said central region having a first zone of diameter $D_1$, having a wall thickness $T_1$, and a second zone of diameter $D_2$, having a wall thickness, $T_2$, wherein $D_1/T_1$ is substantially equal to $D_2/T_2$;

measuring the elastic deformation of the tube in the first zone to provide a first zone deformation signal;

measuring the elastic deformation of the tube in the second zone to provide a second zone deformation signal;

providing a fluid density signal; and comparing the first and second zone deformation signal and the density signal to calculate fluid mass flow.

29. The invention of claim 28 further comprising the step of comparing the first and second zone deformation signal and the density signal to calculate fluid pressure.

30. The invention of claim 28 wherein the step of providing a fluid density signal further comprises measuring the elastic deformation of the tube caused by the weight of the fluid therein to determine fluid density.

31. A method of measuring mass flow of a fluid in a conduit or the like, comprising the following steps:

directing the flow of the fluid to be measured through a segment of thin wall conduit having an inlet, an outlet and a central region freely suspended therebetween, said central region having a first zone of a first hydraulic diameter, and a second zone of a second hydraulic diameter;

measuring the elastic deformation of the conduit in the first zone to provide a first zone deformation signal;

measuring the elastic deformation from the second zone to provide a second zone deformation signal; and measuring the elastic deformation of the tube which results from the weight of the fluid contained in the central region to provide a density signal and comparing the first and second zone deformation signals and density signal to calculate fluid mass flow when the fluid pressure and the fluid density is unknown and vary during measuring.

32. The invention of claim 31 further comprising the steps of measuring the temperature of the conduit to provide a temperature signal, wherein said comparing step further comprises compensating the fluid mass flow output to adjust for errors in elastic deformation measurement caused by temperature variation.

33. A method of measuring mass flow of a fluid in a tube or the like, comprising the following steps:

directing the flow of the fluid to be measured through a segment of thin wall tube having an inlet and outlet end in a central region therebetween of circular cross-section, said central region having a first zone of diameter $D_1$, having a wall thickness $T_1$, and a second zone of diameter $D_2$, having a wall thickness $T_2$, wherein $D_1$ and $D_2$ are substantially different;

measuring the elastic deformation of the tube in the first zone to provide a first zone deformation signal;

measuring the elastic deformation of the tube in the second zone to provide a second zone deformation signal;

providing a fluid density signal; and comparing the first and second zone deformation signal and the density signal to calculate fluid mass flow.

* * * * *

UNITED STATES PATENT AND TRADEMARK OFFICE
CERTIFICATE OF CORRECTION

PATENT NO. : 4,360,594

DATED : August 29, 1989

INVENTOR(S) : Gary C. Hammond et al

It is certified that error appears in the above-identified patent and that said Letters Patent is hereby corrected as shown below:

Column 4, line 12,
delete both occurrences of "a", and replace both with the word --at--.

Column 6, line 24,
" $\sqrt{2}x^A{}_{t2} = P_2 A_{f2} \cdot QV_2$ " should be -- $\sqrt{2}x^A{}_{t2} = P_2 A_{f2} + QV_2$ --.

Column 8, Line 20 (Appln. Page 11, Line 21), delete the frist word "a" and insert --as--.

Signed and Sealed this

Twenty-eighth Day of May, 1991

*Attest:*

HARRY F. MANBECK, JR.

*Attesting Officer*  *Commissioner of Patents and Trademarks*